United States Patent [19]
Yanagi

[11] Patent Number: 4,975,895
[45] Date of Patent: Dec. 4, 1990

[54] TRACK SERVO CONTROL SYSTEM FOR OPTICAL DISK APPARATUS

[75] Inventor: Shigenori Yanagi, Kawasaki, Japan

[73] Assignee: Fujitsu Limited, Kawasaki, Japan

[21] Appl. No.: 236,915

[22] Filed: Aug. 26, 1988

[30] Foreign Application Priority Data

Aug. 28, 1987 [JP] Japan ................................. 62-214554

[51] Int. Cl.[5] .............................................. G11B 7/00
[52] U.S. Cl. ................................................ 369/44.29
[58] Field of Search ........................ 369/32, 44, 45, 46, 369/44.29, 44.35, 44.36

[56] References Cited

U.S. PATENT DOCUMENTS

| | | | |
|---|---|---|---|
| 4,539,665 | 9/1985 | Iso et al. | 369/44 |
| 4,544,872 | 10/1985 | Hirano et al. | 369/44 |
| 4,562,562 | 12/1985 | Moriya et al. | 369/32 |
| 4,700,056 | 10/1987 | Silvy et al. | 369/45 |
| 4,748,607 | 5/1988 | Nakane | 369/32 |
| 4,764,911 | 8/1988 | Morota et al. | 369/32 |
| 4,796,246 | 1/1989 | Tsuyoshi et al. | 369/32 |
| 4,817,069 | 3/1989 | Shigemori | 369/44 |
| 4,827,464 | 5/1989 | Tateishi | 369/44 |
| 4,835,754 | 5/1989 | Yamamoto et al. | 369/32 |

*Primary Examiner*—Donald McElheny, Jr.
*Attorney, Agent, or Firm*—Staas & Halsey

[57] ABSTRACT

A track servo control system provided in an optical disk apparatus, having a low servo gain used in a pull-in operation mode and a high servo gain used after completion of the pull-in control mode, for speeding-up a pull-in of a servo track with a high stability during the pull-in operation mode and maintaining a high accuracy of position control of an optical head during a fine position control mode.

10 Claims, 11 Drawing Sheets

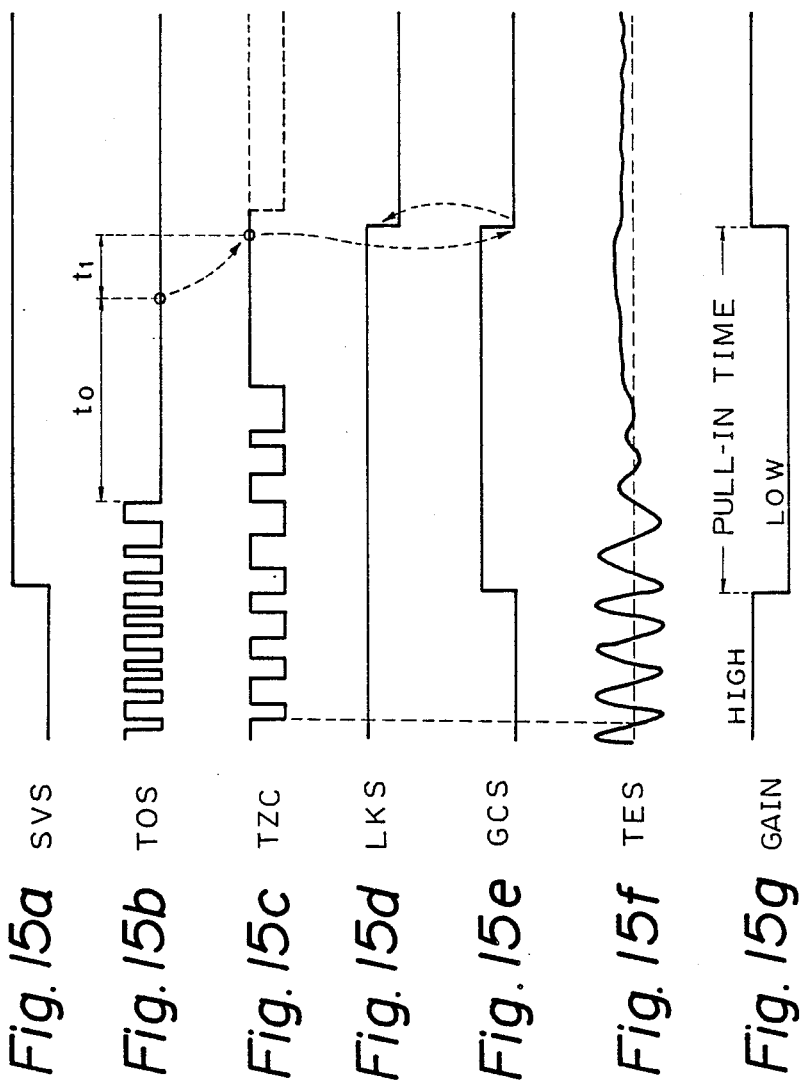

TRACK SERVO CONTROL SYSTEM FOR OPTICAL DISK APPARATUS

BACKGROUND OF THE INVENTION

1. Field of the Invention

The present invention relates to a track servo control system for use in an optical disk apparatus to control a light spot from an optical head to follow a track on an optical disk, and more particularly, to a track servo control system for speeding-up a pull-in time of a track servo and improving the stability of a servo system.

2. Description of the Related Art

In optical disk apparatuses, each track spacing can be several microns because a light beam is used to read and/or write data. Therefore, due to its large capacity storage, the optical disk units have been attracting increasingly more attention in this field. An optical disk apparatus is provided with a track servo control system for controlling a light beam (light spot) to follow the light beam on a track. The track servo control system utilizes the diffraction of the light beam from a guide groove (pre-groove) in an optical disk media to obtain a track error signal, thereby applying a servo control to make the light spot follow the track (guide-groove). Such a track servo control system is required for a rapid pull-in of a servo control and an improved stability of the servo system. However, the prior art track servo control suffers from a low pull-in speed of the servo control and a low stability when the optical disk apparatus is operated in the seek mode. This will be described in detail later with reference to the drawings.

SUMMARY OF THE INVENTION

An object of the present invention is to provide a track servo control system for an optical disk apparatus by which a pull-in speed of a track servo and the stability of a servo system are improved.

According to the present invention, there is provided a track servo control system for an optical disk apparatus including a rotatable optical disk on which a plurality of grooves for recording data are spirally formed along a direction of rotation of the optical disk, an optical head which is movable in a radial direction across the optical disk and includes a light source for emitting a light onto a groove, an intermediate optical system including a beam splitter, an object lens for focusing the light from the light source onto a groove through the intermediate optical system and receiving a light reflected from a groove, a track error sensor for receiving the reflected light through the intermediate optical system and outputting a track error signal in response to a deviation of the light incident on a groove from the center of the groove, and a track actuator for moving the object lens in the radial direction. The servo control system includes a servo pull-in detecting unit, operatively connected to the track error sensor, for detecting a completion of a servo pull-in operation in accordance with the track error signal, and a servo control unit, operatively connected to the track error sensor and the track actuator, for controlling the track actuator in response to the track error signal to position the object lens so that the light from the object lens is incident on the center of a desired groove on the optical disk, and having a low servo control gain and a high servo control gain. The low servo control gain is selected by the servo pull-in detecting unit during the servo pull-in operation, and the high servo control gain is selected by the servo pull-in detecting unit after completion of the servo pull-in operation.

The servo control unit includes a gain exchange circuit for receiving the track error signal, and changing the control gain from a low servo control gain to a high servo control gain, or vice versa, in response to a gain change signal from the servo pull-in detecting unit, and multiplying the selected servo control gain with the track error signal, and a phase compensation circuit connected to the gain exchange circuit for receiving a signal therefrom, and including a proportional circuit for generating a signal proportional to the received signal, a differential circuit for carrying out a phase-compensation of the received signal, and an adding circuit for adding the signals from the proportional circuit and the differential circuit, and outputting the resultant added signal as a servo control signal. The servo control unit includes a servo switching circuit, operatively connected to the track actuator, for switching the servo control signal from the phase compensation circuit, so that the servo control signal to the track actuator is cut off during a seek operation of the optical head, or is applied to the track actuator after completion of the seek operation.

The track servo control system further includes a return signal generation unit for receiving the track position signal from the track position sensor and generating a return signal for restoring the track actuator to the center position thereof in response to the track position signal, and a lock switching circuit, operatively connected to the return signal generation unit, for passing the return signal to the track actuator to lock the track actuator during a servo pull-in operation and cutting off the return signal to the track actuator during the seek operation and after the servo pull-in operation. The track actuator is driven in response to a signal which is a summation of a servo control signal from the servo control unit and the return signal.

The servo pull-in detecting unit includes a zero cross detection circuit for detecting a time at which the track error signal crosses a zero voltage and outputting a track zero cross signal, an off track detection circuit for detecting whether the track error signal is in a predetermined range and outputting an off-track signal, and a supervisory controller, operatively connected to the zero cross detection circuit and the off track detection circuit, for detecting a completion of the servo pull-in in accordance with the track zero cross signal and the off-track signal.

The supervisory controller determines the completion of the servo pull-in when a first predetermined time has elapsed after the issue of the off track detection signal, and a second predetermined time is continued when the track zero cross signal is not changed after the elapse of the first predetermined time.

The track servo control system further includes an automatic gain control unit, operatively connected between the track error sensor, the servo pull-in detecting unit and the servo control unit, for automatically controlling a gain of the track error signal to supply a gain adjusted track error signal to the servo pull-in detecting unit and the servo control unit.

The present invention also provides a method for controlling a track servo, including the steps of: locking-on the track actuator to lock-on the track actuator at a restore position thereof just after completion of a seek operation; selecting the low servo control gain at the servo control unit; energizing the servo control unit to pull-in a servo control loop of the track actuator; detecting the completion of the servo pull-in; selecting the high servo control gain at the servo control unit after completion of the servo pull-in; and releasing the lock-on of the track actuator.

BRIEF DESCRIPTION OF THE DRAWINGS

Other objects and features of the present invention will be described in more detail with reference to the accompanying drawing, in which:

FIGS. 15a to 15g are waveform diagrams illustrating the signals generated in the system shown in FIGS. 10 to 13.

DESCRIPTION OF THE PREFERRED EMBODIMENT

Before describing the preferred embodiment of the present invention, a general optical disk drive system and a prior art track servo control system thereof will be described to provide an easy understanding of an optical control and to distinguish the differences between the prior art track servo control system and the embodiment of the present invention.

Figure 1:
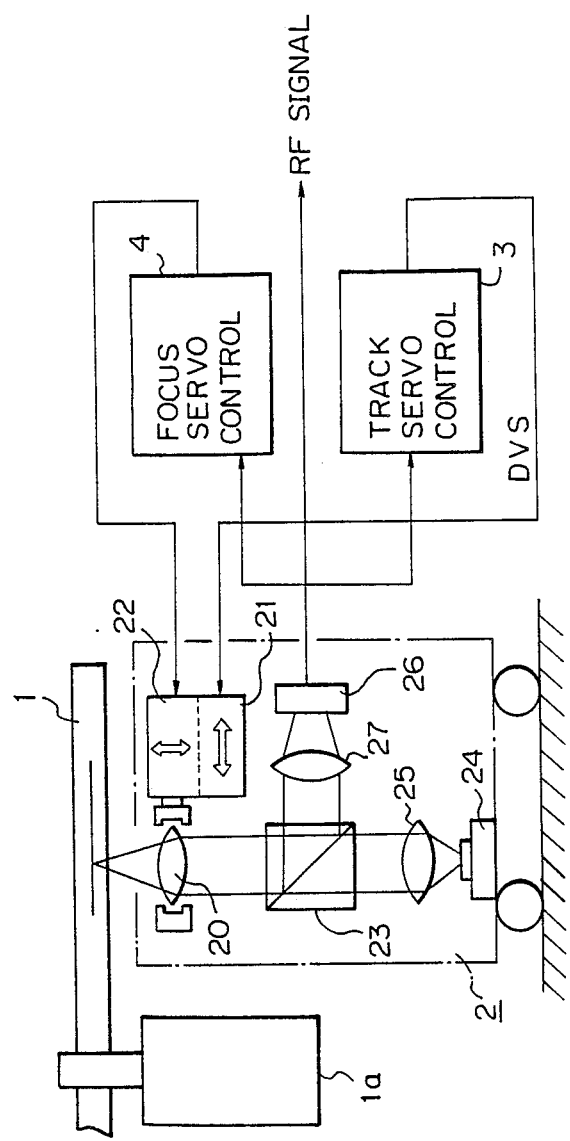
FIG. 1 is a block diagram of a general optical disk drive system.
Figure 4A:
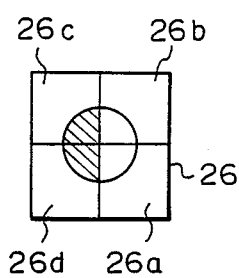

FIG. 1 shows a block diagram of a general optical disk drive system. In the drawing, the optical disk drive system includes an optical disk 1 rotated by a motor 1a, an optical head 2, a track servo controller 3, and a focus servo controller 4. The optical head 2 includes an object lens 20, a track actuator 21 having a drive coil (not shown), a focus actuator 22 having a drive coil (not shown), an optical system 23 having a beam splitter, a light source 24 having a semiconductor laser diode, a lens 25, a four-division light receiver 26 consisting of four light sensors 26a to 26c as shown in FIG. 4a, and a converging lens 27. The optical head 2 is radially moved and positioned by a drive motor (not shown) with respect to the optical disk 1, which is rotated by the motor 1a about the shaft thereof, and reads (reproduces) and/or writes (records) the data from and/or to the optical disk 1. A light emitted from a light source 24 in the optical head 2 is directed through the lens 25 and the optical system 23 having the polarized-light beam splitter to the object lens 20, which reduces the light to a beam spot (light spot) BS to be projected onto the optical disk 1. The reflected light from the optical disk 1 is directed through the object lens 20 and projected from the polarized-light beam splitter onto the four-division light receiver 26, through the lens 27.

In such an optical disk unit, many tracks or pits are formed radially on the optical disk 1 with a spacing of several microns, usually 1.6 μm, between successive tracks. Any small eccentricity of the tracks causes them to deviate positionally and also any undulation of the disk causes the focal position of the beam spot to deviate. Accordingly, the beam spot must be as small as possible, i.e., less than 1 micron, to follow such positional deviations. To this end, there are provided a focus actuator (focus coil) 22, which moves the object lens 20 of the optical head 2 vertically (as viewed in the plane of the drawing) to change the focal position, and a track actuator (track coil) 21, which moves the object lens 20 laterally (as viewed in the plane of the drawing) to change the light projection position in the direction of the track. Further, there are provided a focus servo controller 4, which generates a focus error signal FES from the light signal from the light receiver 26 to drive the focus actuator 22, and a track servo controller 3 which generates a track error signal TES from the light signal from the light receiver 26 to drive the track actuator 21.

First, in a seek control mode, the optical head 2 is moved to a desired track on the optical disk 1, and then, in a fine position control mode, the optical head 2 is finely positioned at the desired track. In the fine position control mode, a data read from or a data write to the desired track can be carried out. To carry out this data read or data write, a light emitted from the light source 24 in the optical head 2 is directed to the object lens 20 through the optical system 23 and focused on a groove of the track in the optical disk 1. A beam spot focused at the object lens 20 and incident on the groove is reflected, and the reflected beam spot is received at the optical system 23 through the object lens 20. The beam spot received at the optical system 23 is supplied to the light receiver 26 to generate a reproduction signal RF. The reproduction signal is used for a data read and a level control. Also, the beam spot received at the optical system 23 is supplied to the four-division light receiver 26 to output four electrical signals corresponding to the received light signals and used for generating a track error signal TES. The generation of the track error signal TES will be described later.

The focus servo controller 4 receives a focus error signal FES from the four-division light receiver 26 and adjusts the focal position of the object lens 20 by moving the object lens 20 in a vertical direction, through the focus actuator 22 connected to the object lens 20. The track servo controller 3 also receives the track error signal TES from the four-division light receiver 26 and adjusts a track position of the object lens 20 by moving the object lens 20 in a horizontal direction, through the track actuator 21, in response to the track error signal TES.

Figure 2:
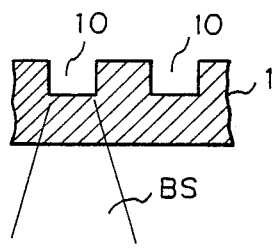
FIG. 2 is an enlarged cross sectional view of an optical disk 1 shown in FIG. 1
Figure 4B:
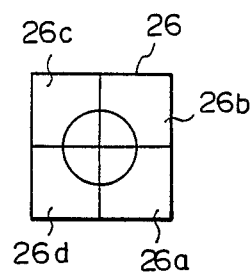
Figure 4C:
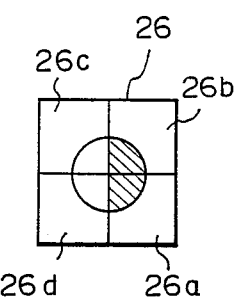

The operation of the track servo control will now be described in detail. The track servo control uses a diffraction of the beam spot BS by the groove 10 of the optical disk 1, as shown in FIG. 2. Namely, a reflection light quantity distribution at the four-division light receiver 26 is varied in response to the position in the groove 10 of the beam spot BS, and thus a change of the light diffraction therefrom occurs as shown in FIGS. 4a to 4c. The track error signal TES is obtained by using the change of the light diffraction. The four-division light receiver 26 consists of four light sensors a, b, c, and d, and outputs four electrical signals La, Lb, Lc, and Ld corresponding to the received light signals, respectively. The track error signal TES is defined by the following formula:

$$TES = (La + Ld) - (Lb + Lc) \quad (1)$$

Figure 3:
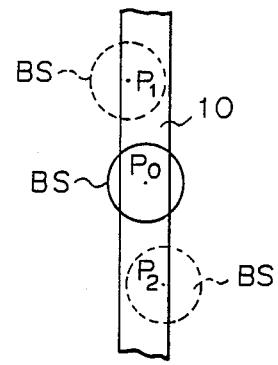
FIGS. 3, 4a, 4b to 4c are diagrams for explaining the sensing of a groove in the optical disk shown in FIG. 2 by a four-division light receiver.
Figure 5:
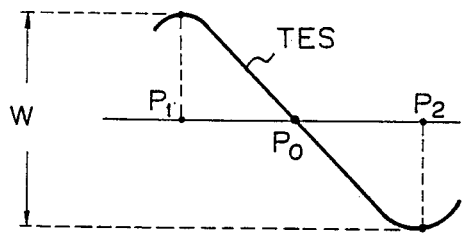
FIG. 5. is a graph representing a track error signal obtained by the four-division light receiver shown in FIGS. 4a to 4c.

When a center of the beam spot BS is at a position $P_1$ shown in FIG. 3, two sensors a and b receive the reflected light as shown in FIG. 4a, and as a result, the track error signal TES is a positive maximum value, as shown in FIG. 5, in accordance with the formula (1). When a center of the beam spot BS is at a position $P_0$, as shown in FIG. 3, the track error signal TES is 0 (zero), as shown in FIG. 5. Conversely, when a center of the beam spot BS is at a position $P_2$, as shown in FIG. 3, the track error signal TES is a negative minimum value, as shown in FIG. 4c. Accordingly, by using the track error signal TES, the track servo controller 3 drives the object lens 20 by using the track actuator 21 to place a center of the beam spot BS at a center of the groove 10 of the optical disk 1.

Figure 6:
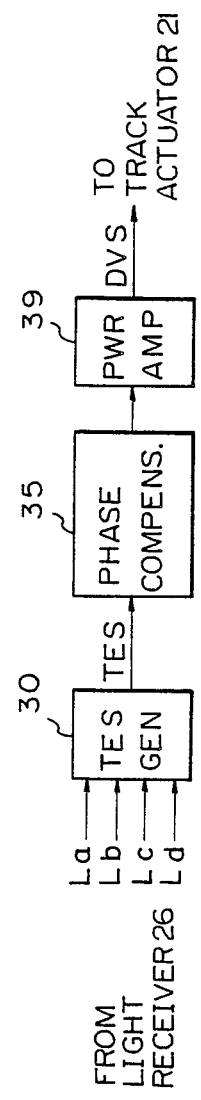
FIG. 6 is a block diagram of a general track servo control system.

As seen from FIG. 6, the above-mentioned track servo controller 3 comprises a TES generator circuit 30, which produces the track error signal TES from the outputs La to Ld from the light receiver 26, a phase compensator circuit 35 for compensating the phase of the track error signal TES by generating a differential signal and proportional signal, and a servo system including a power amplifier 39 which amplifies the output from the phase compensator circuit 36, whereby the track actuator 21 is driven by a drive signal DVS from the power amplifier 39.

Figure 7B:
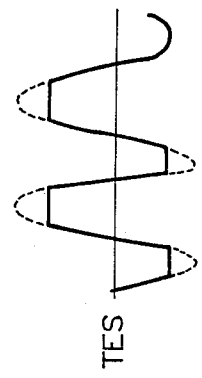
FIGS. 7a and 7b and FIGS. 8a and 8b are graphs representing wave forms of track error signals of the prior art.
Figure 7A:
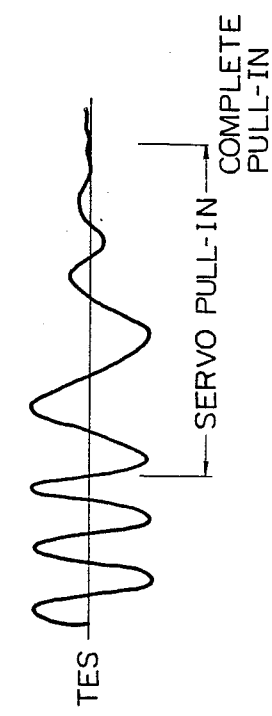

Also in the track servo controller 3, when the servo control is applied as shown in FIG. 7a at which no servo control is being applied, the servo-control is started and the servo control is effected for the track error signal TES to come to end until the track error signal TES comes in a predetermined range. Then the servo-control is completed, i.e., the beam spot is precisely positioned on the track. Subsequently, the beam spot BS is controlled based on the track error signal TES, to follow the track.

In this conventional servo track controller 3, to attain a stable servo control as in the usual servo system, a servo gain is set at an optimum value in the on-track state after completion of the servo pull-in, and also it is set at a relatively high level such that the servo loop will not usually resonate at a high frequency.

Figure 8A:
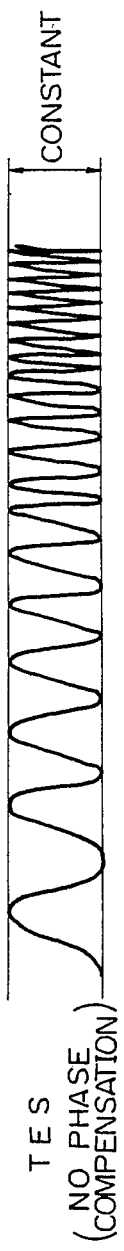
Figure 8B:
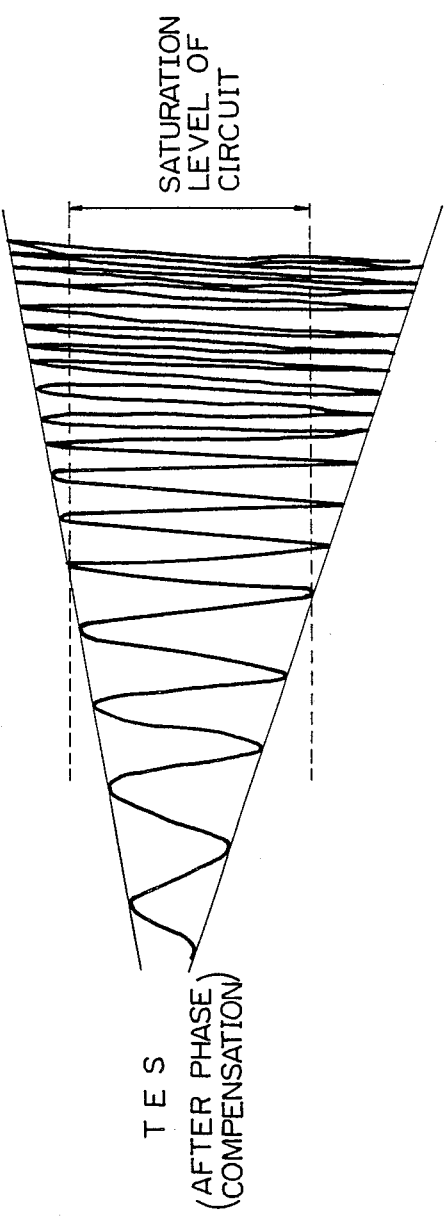

At the start of the servo pull-in, the beam spot BS does not follow the track, and thus the track error signal TES has a high frequency. This is due to the eccentricity of the optical disk 1, as described in the foregoing, and because the servo control pull-in has been carried out after the optical disk 1 has completely moved with the result of a residual vibration due to the movement and stop. The servo loop will not resonate with such a high frequency, but since the high frequency band is enhanced by the phase compensator circuit 35 as shown in FIG. 8b, if the servo pull-in is carried out with the aforementioned high servo gain, the circuits in the track servo controller 3 will be saturated, as shown in FIG. 7b, so that the input signal to the power amplifier 39 in FIG. 6 takes the form of a pulse. At this time, the drive signal DVS for pulling-in the servo is determined by the saturation level and a duty cycle. The duty cycle is nearly 50%, since the waveform of the track error signal TES is symmetrical.

Namely, the drive signal DVS contains little information about the servo error signal, and if the small asymmetry of the saturation level coincides with the direction of motion of the beam spot, the servo actuator 21 will run as uncontrolled. Thus, the servo control pull-in can be done neither smoothly nor rapidly.

An object of the present invention is to provide a track servo control system for use in an optical disk apparatus, by which a track servo pull-in can be rapidly carried out and the servo system can operate stably.

According to a basic concept of the present invention, different servo gains are selected during the servo pull-in and after completion of the servo pull-in, respectively. As the servo gain is increased, a strong servo control is applied, and the servo control is stabilized correspondingly. However, if a high frequency is generated during the servo control, as mentioned above, the circuitry will be saturated. On the other hand, when the servo gain is set at a low value, a weak servo control is applied, and thus the circuit saturation due to the high frequency generated during the servo control can be prevented but the servo control stability is reduced.

Accordingly, an optimum servo gain is selected for both a rapid servo pull-in and a high stability of the servo system, by selecting, at the time of a servo pull-in, a low servo gain by which the circuitry does not suffer the saturation caused by a high frequency generated at the time of a servo pull-in, and therefore, the servo control can be rapidly applied, and upon completion of the servo pull-in, selecting a high servo gain with which the servo system can operate most stably. Therefore, the servo control can be applied rapidly while the servo system is kept stable, and thus an improved access speed can be obtained.

Figure 9A:
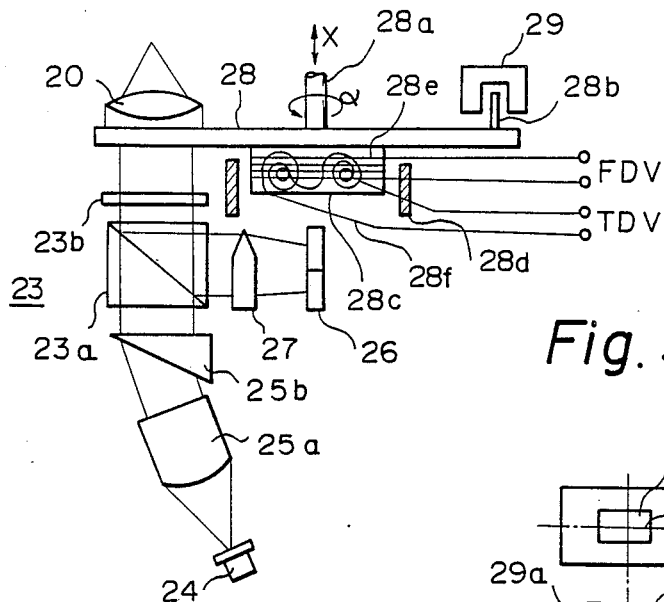
FIGS. 9a, 9b and 9c are diagrams representing a detailed structure of an optical head in accordance with the present invention.
Figure 9B:
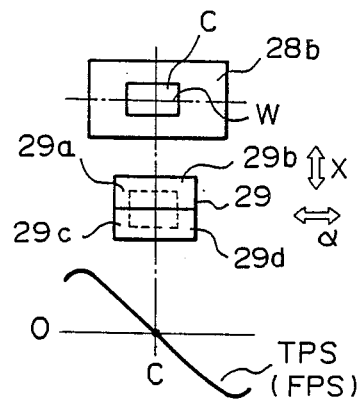
Figure 9C:
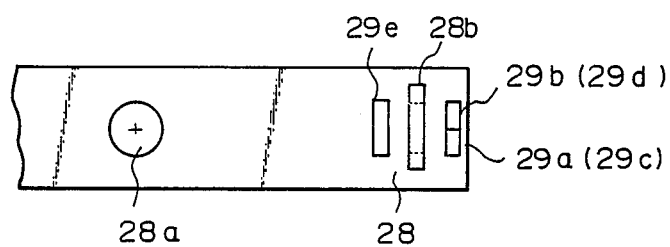
Figure 10:
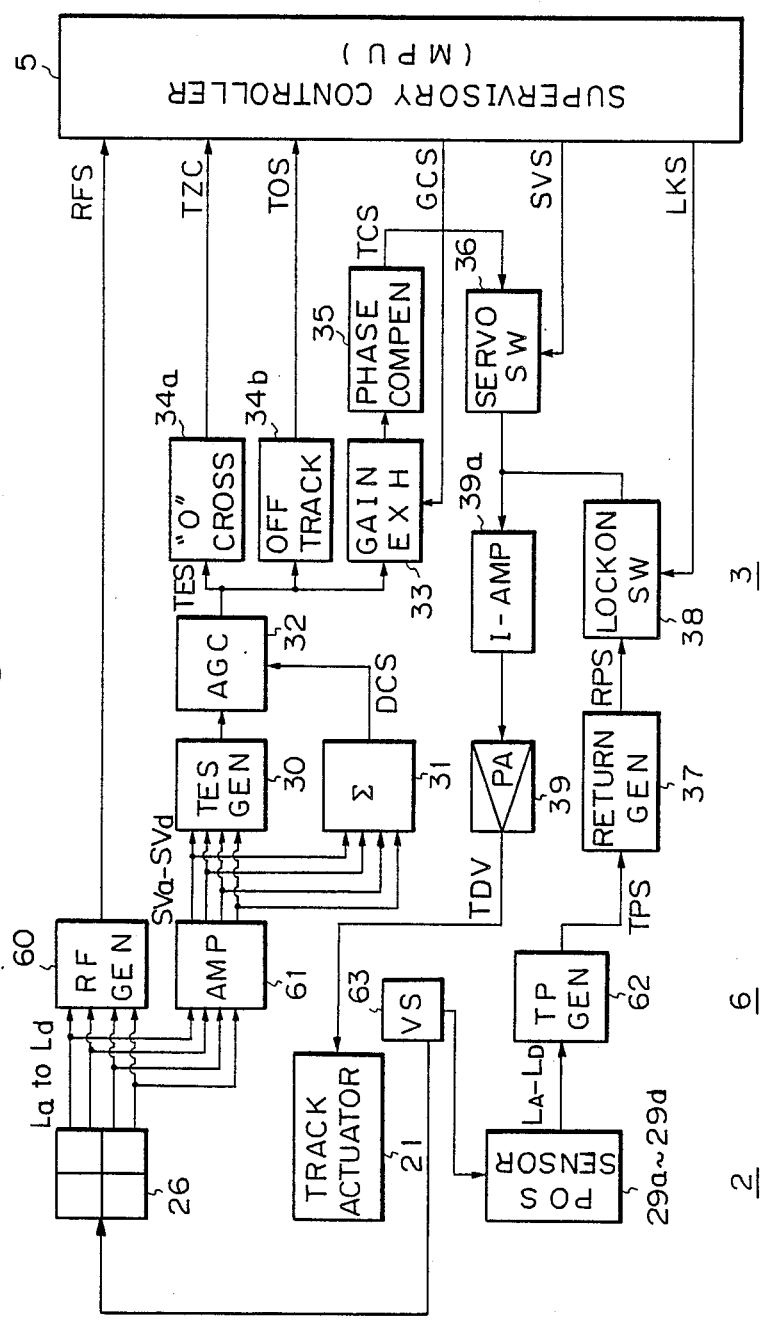
FIG. 10 is a block diagram of an embodiment of a track servo control system for an optical disk apparatus in accordance with the present invention.
Figure 11:
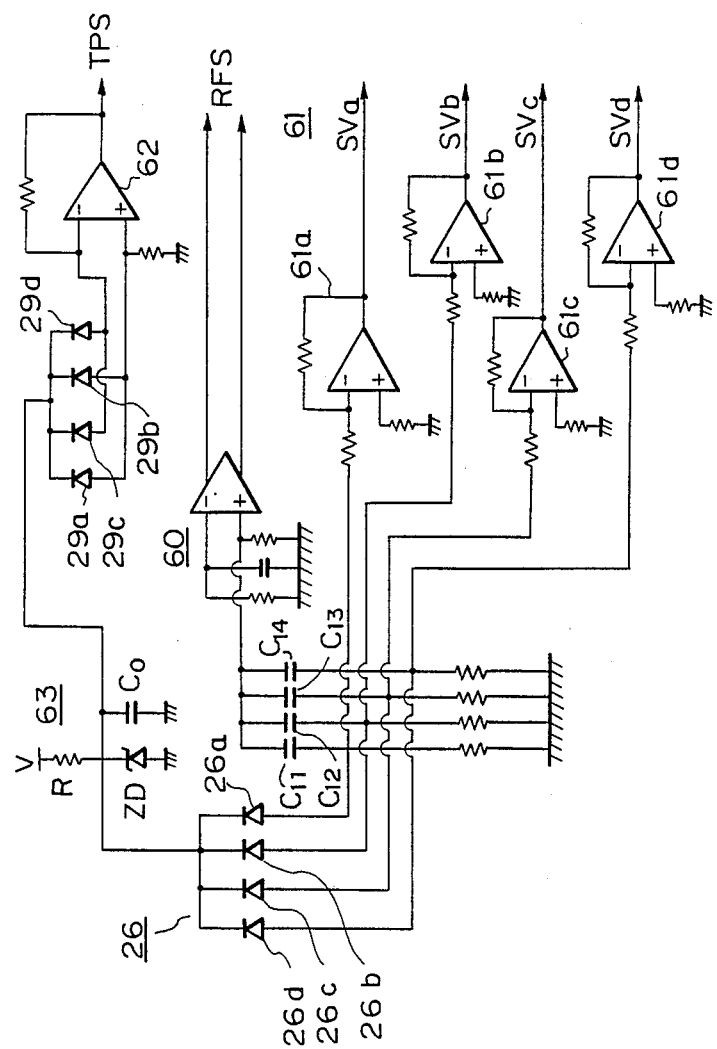
FIG. 11 is a circuit diagram of the optical head circuit 6 and part of the optical head 2 in FIG. 10.

Now, preferred embodiments of the present invention will be described. FIGS. 9a to 9c show the construction of the optical head 2, FIG. 10 is a block diagram of a track servo controller of an embodiment in accordance with the present invention, and FIG. 11 is a circuit diagram of the optical head. In these Figures, the same elements as in FIGS. 1 to 6 are indicated by the same reference numerals and symbols.

First, the construction of the optical head 2 will be described with reference to FIGS. 9a to 9c. As seen in FIG. 9a, the light beam from the light source 24, for example, a semiconductor laser, is made parallel by a collimator lens 25a and corrected to be given a circular sectional shape by a circular correction prism 25b. The thus-corrected light beam is made incident upon the optical system 23 including the polarized-light beam splitter 23a, and further projected onto the object lens 20 through a quarter wavelength ($\lambda/4$) plate 23b. The object lens 20 focuses the light beam to form a beam spot BS. The light reflected from the optical disk 1 (not shown in FIG. 9a) is made incident upon the polarized-light beam splitter 23a through the quarter wavelength plate 23b, and the light is then projected onto the four-divided light receiver 26 through the converging lens 27. The object lens 20 is provided on one end of the actuator body 28 rotatable about the shaft 28a, and a fixed slit 28b is formed at the other end of the actuator body 28. The actuator body 28 is provided with a coil 28c around which a focus coil 28e is provided. Note, a spiral track coil 28f is provided on the side of the coil 28c, and a magnet 28d is provided around the coil 28c. Therefore, when the focus coil 28e is supplied with a current, the actuator 28 having the object lens 20 mounted thereon is moved up or down in the axial direction X shown in FIG. 9a by the voice coil motor (not shown), thereby permitting a change of the focal position. When the track coil 28f is supplied with a current, the actuator body 28 is rotated in the direction of the arrow α about the rotating shaft 28a, whereby the position in the running direction of the track can be changed. A position detector 29 is provided facing the fixed slit 28b at the end of the actuator body 28.

As shown in FIGS. 9b and 9c, the position detector 29 has a light emitter 29e and four-divided photodetectors 29a to 29d which are positioned opposite the light emitter 29e, and the fixed slit 28b is position between the light emitter 29e and the photodetectors 29a to 29d. The fixed slit 28b is provided with a window W through which the light from the light emitter 29e is received by the four-divided photodetectors 29a to 29d. As shown in FIG. 9b, the distribution of light detected by the four-divided photodetectors 29a to 29d varies, depending upon the movement of the actuator body 28 in the directions of arrows α and X. Therefore, a track position signal TPS in the running direction of the track and a focus position signal FPS in the direction of the focus can be determined as follows from the light outputs $L_A$, $L_B$, $L_C$ and $L_D$ from the photodetectors 29a to 29d, similar to the focus and track servo controls:

$$TPS = (L_A + L_C) - (L_B + L_D) \quad (2)$$

$$FPS = (L_A + L_B) - (L_C + L_D) \quad (3)$$

These position signals TPS and FPS can be represented in the form of an S which is zero at the center thereof in relation to the deviation from the center C, as shown in FIG. 9b, and are used to provide an electrical spring force in the direction of the center.

Referring to FIG. 10, reference numeral 5 indicates a supervisory controller composed of a microprocessor unit (MPU). The supervisory controller 5 controls the servo control operations of the track servo controller 3 using a track zero-cross signal TZC, an off-track signal TOS, a gain changeover signal GCS, a servo-on signal SVS, and a lock-on signal LKS, according to the flow chart shown in FIG. 14, and further controls the servo control operations of the focus servo controller 4. Reference numeral 6 indicates an optical head circuit composed of an RF generator circuit 60 for generating an RF signal RFS in response to the outputs La to Ld from the four-division light receiver 26, an amplifier 61 which amplifies the outputs La to Ld from the four-division light receiver 26 and outputs servo outputs SVa to SVd, a TP generator circuit 62 for generating the track position signal TPS in response to the outputs $L_A$ to $L_D$ from the four-divided photodetectors 29a to 29d in the position detector 29, the four-division light receiver 26, and a voltage stabilizer 63 for the position detector 29, etc.

As shown in FIG. 11, the voltage stabilizer 63 consists of a Zener diode ZD, a capacitor $C_0$ and resistor R, and is connected to and supplies a constant voltage to the four photo sensors 26a to 26d formed by photo diodes and together forming the four-division light receiver 26, and four photo detectors 29a to 29d of the photo detector 29 formed by photo diodes. Also, the TP generator circuit 62 is composed of a differential amplifier for generating the track position signal TPS by a differential operation and amplification to obtain $(L_A + L_B) - (L_C + L_D)$ of the outputs $L_A$ to $L_D$ from the photodiodes 29a to 29d. The RF generator circuit 60 is formed as a highpass filter to add AC components of the outputs from the four photodiodes 26a to 26d through capacitors $C_{11}$ to $C_{14}$. The RF signal RFS thus produced is delivered to the supervisory controller 5. Furthermore, the amplifier 61 is composed of amplifiers 61a to 61d connected to the photodiodes 26a to 26d, respectively, and outputs the servo outputs SVa to SVd.

Referring back to FIG. 10, reference numeral 30 indicates the aforementioned TES generator circuit for generating the track error signal TES in response to the servo outputs SVa to SVd from the amplifier 61, and reference numeral 31 indicates a total signal generator circuit for generating a total signal DCS indicative of a total reflection level by adding together the servo outputs SVa to SVd. Reference numeral 32 indicates an AGC (automatic gain control) circuit which automatically controls the servo gain, taking the total reflection level as a reference value by dividing the track error signal TES by the total signal DCS, to correct variations of the intensity of the projected beam and reflected light. Reference numeral 33 indicates a servo gain changeover circuit which changes the servo gain for the track error signal TES, after an AGC is carried out between the high and low levels, with a changeover signal GCS from the supervisory controller 5. Reference numeral 34a indicates a zero-cross detector which detects the zero-cross point of the track error signal TES and outputs a track zero-cross signal TZC to the supervisory controller 5. Reference numeral 34b indicates an off-track detector which detects a status when the track error signal TES has a value higher than the predetermined positive-going value Vo and lower than the predetermined negative-going value −Vo, namely, when an off-track state exists, and outputs an off-track signal TOS to the supervisory controller 5. Reference numeral 35 indicates a phase compensator circuit which differentiates the track error signal TES, which has been given a servo gain, and adds the resultant signal to the proportional component of the track error signal TES, to advance the phase of the track error signal TES at a high frequency band. Reference numeral 36 indicates a servo switch which is closed when the servo-on signal SVS from the supervisory controller 5 is high level, to close the servo loop, and opened when the signal SVS is low level, to open the servo loop. Reference numeral 37 indicates a return signal generator circuit which generates a return signal RPS in response to the track position signal TPS from the RP generator circuit 62; the return signal RPS providing a return force in the direction of the track toward the center of the actuator 28 shown in FIG. 9b. Reference numeral 38 indicates a lock-on switch which is closed when a lock-on signal LKS from the supervisory controller 5 is high level, to introduce the return signal RPS to the servo loop, and opened when the lock-on signal LKS is low level, to cut off the return signal RPS supplied to the servo loop. Reference numeral 39a indicates an inversion amplifier 39a which inverts the signal resulting from the addition of the outputs of the servo switch 36 and lock-on switch 38. Reference numeral 39 indicates a power amplifier which amplifies the output from the inversion amplifier 39a and supplies the same to the track actuator 21 as a track drive current TDV.

Figure 12:
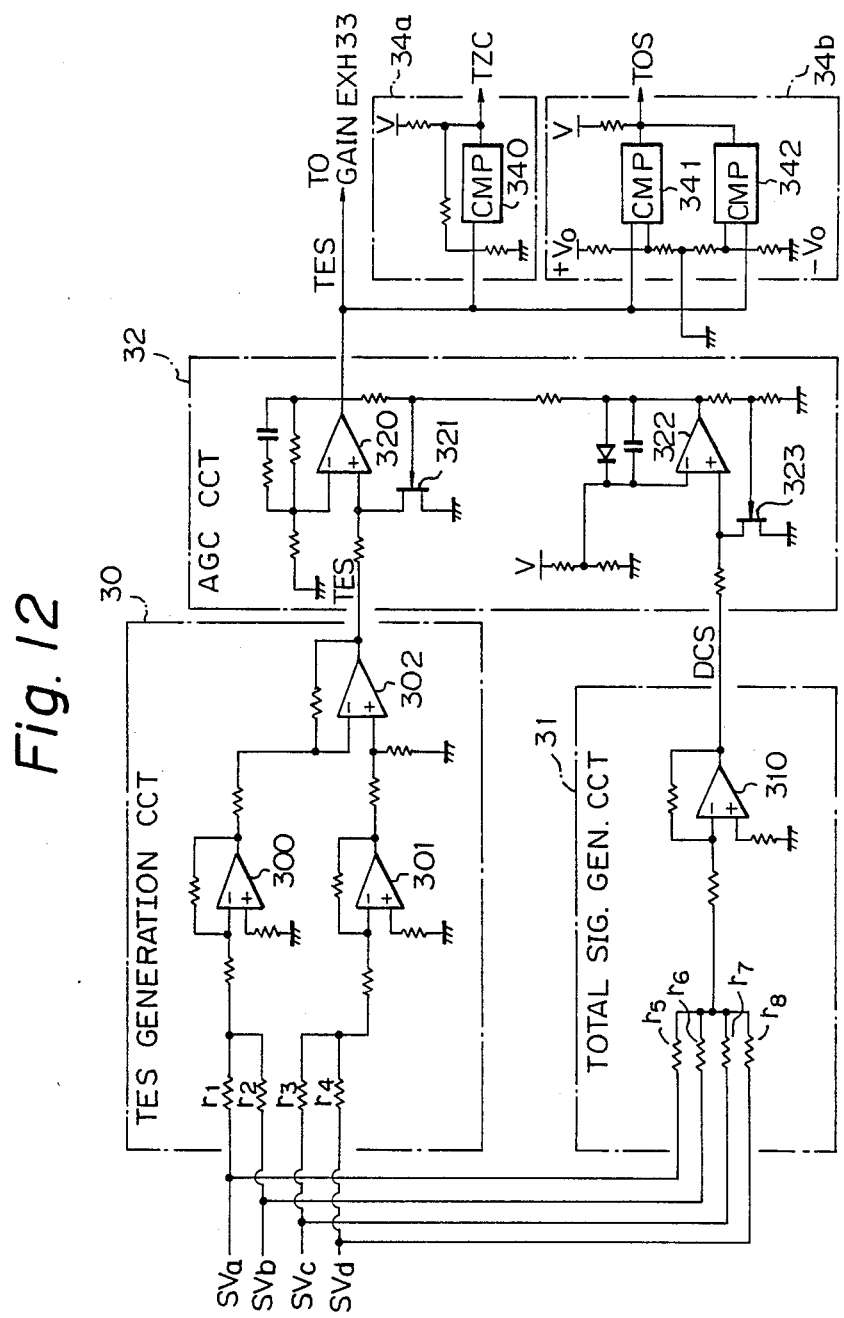
FIGS. 12 and 13 are circuit diagrams of the track servo controller 3 of FIG. 10.
Figure 13:
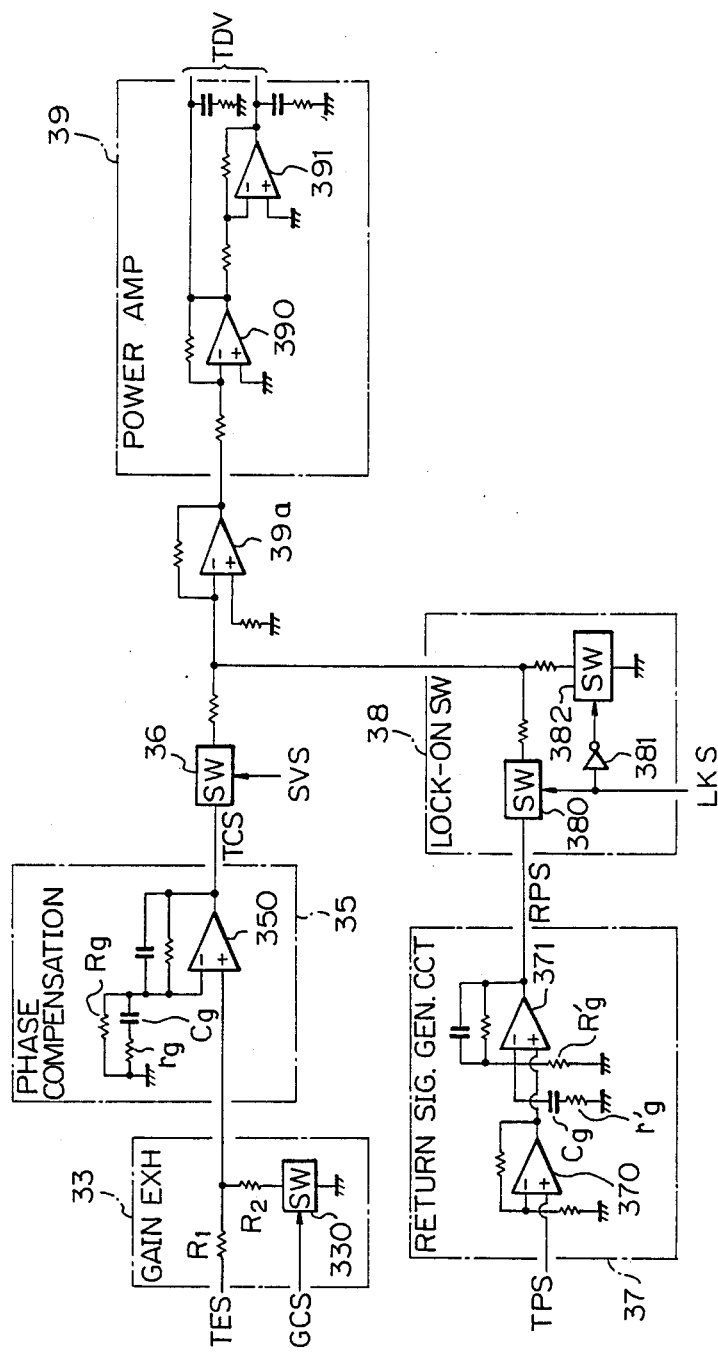

FIGS. 12 and 13 show circuit diagrams of the track servo controller 3. As shown in FIG. 12, the TES generator circuit 30 comprises input resistors $r_1$ to $r_4$; an addition amplifier 300 which adds the servo outputs SVa and SVb supplied through the input resistors r1 and r2, respectively; an addition amplifier 301 which adds the servo outputs SVc and SVd supplied through the input resistors r3 and r4, respectively; and an addition amplifier 302 which subtracts the output (SVa+SVb) of the addition amplifier 301 from the output (SVc+SVd) of the addition amplifier 300, and outputs the track error signal TES=(SVa+SVb)−(SVc+SVd). The total signal generator circuit 31 comprises input resistors r5 to r8, and an addition amplifier 310 which adds the servo outputs SVa to SVd through the input resistors r5 to r8, respectively, to output the total reflection level signal DCS =SVa +SVb +SVc +SVd. The AGC circuit 32 comprises a first operational amplifier 320 which receives the track error signal TES, a first field effect transistor (FET) 321 which controls the input signal of the first operational amplifier 320 by controlling a resistance of the resistor connected thereto, a second operational amplifier 322 which receives the total reflection signal DCS and controls the FET 321, and a second FET 323 which controls the input signal of the second operational amplifier 322 by controlling the resistance of the resistor connected thereto. In this AGC circuit 32, the first FET 321 is controlled by the total reflection signal DCS output from the operational amplifier 322 to provide the track error signal TES which has been automatic-gain-controlled. The second FET 323 is provided to compensate a nonlinear characteristic of the first FET 321 and give a linear characteristic to the first FET 321. The zero-cross detection circuit 34a is composed of a comparator 340 which compares the track error signal TES from the AGC circuit 32 with the zero-cross potential, and outputs the zero-cross signal TEC from the comparator 340. The off-track detector circuit 34b comprises a first comparator 341 which compares the track error signal TES from the AGC circuit 32 with a predetermined value Vo, to output an output having a high level when TES>Vo, and a second comparator 342 which compares the track error signal TES with a predetermined value −Vo and outputs an output having a high level when TES comparators 341 and 342 as an off-track signal TOS.

In FIG. 13, the gain changeover circuit 33 is a voltage-divider type circuit in which a voltage-dividing resistor R2 and a switch 330 are connected to the ground side of the input resistor R1. The switch 330 is energized by the gain changeover signal GCS to connect the voltage-dividing resistor R2 to the ground potential, thereby reducing the output voltage by a half when the switch 330 is deenergized. The phase compensator circuit 35 consists of an operational amplifier 350, a differential circuit composed of a resistor rg and a capacitor Cg, and a proportional circuit comprising a resistor Rg, and outputs a track control signal TCS indicative of the sum of the differentiation and proportioning of the track error signal TES from the gain changeover circuit 33, namely, the signal TCS resulting from the addition of a phase advance factor to the track error signal TES, to the servo switch 36. The return signal generator circuit 37 comprises a first operational amplifier 370 which amplifies the track position signal TPS from the TP generator circuit 62, and a phase compensator circuit which is composed of a second operational amplifier 371, a differential circuit composed of a capacitor C'g and a resistor r'g, and a proportional resistor R'g, and compensates the phase of the output from the operational amplifier 370 and outputs the return signal RPS. The lock-on switch 38 is energized when the lock-on signal LKS is high level, and comprises a first switch 380 which adds the return signal RPS to the signal TCS from the servo switch 36, an inverter circuit 381 which inverts the lock-on signal LKS, and a second switch 382 which is energized when the inverted lock-on signal LKS is high level, namely, when the lock-on signal LKS is low level. The power amplifier 39 includes amplifiers 390 and 391 at two stages, connected in series with each other, and amplifies the output from the inversion amplifier 39a to supply track drive currents TDV having a positive polarity and a negative polarity to the track actuator 21.

Figure 14:
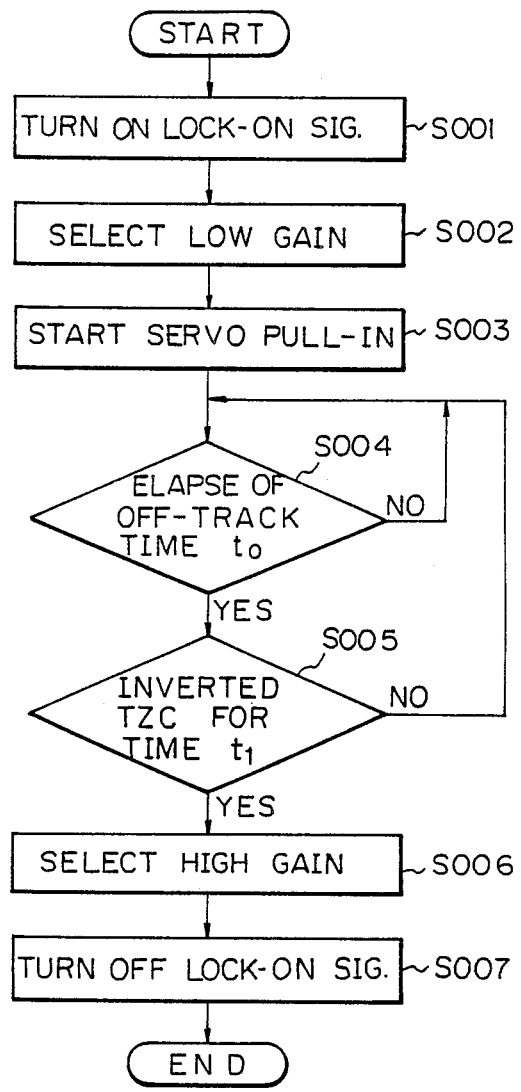
FIG. 14 is a flow chart explaining the operation of the servo track control system shown in FIG. 10 to 13.

FIG. 14 is a flow chart explaining the operations of the embodiment of the present invention, as shown below, and FIGS. 15a to 15g show waveforms of signals shown in FIGS. 10 to 13. The supervisory controller 5 is realized by a microprocessor unit (MPU).

STEP 001 (S001)

First, the motor for driving the optical head 2 (not shown) is driven to move the optical head 2 to a position on a target track given by a host controller (not shown). At this time, the MPU 5 outputs the lock-on signal LKS having a high level and the servo-on signal SVS remains at a low level. Therefore, the servo loop is not formed by the track error signal TES, but the track actuator 21 is locked by the track position signal TPS derived from the outputs $L_A$ to $L_D$ of the position detectors 29a to 29d. As a result, the track coil 28f is driven by the return signal RPS from the return signal generator circuit 37 through the lock-on switch 38 and the power amplifier 39, and the actuator 28 is restored to the central position and fixed thereat.

The locking of the actuator 28, i.e., locking of the object lens 20, prevents movement of the actuator 28 within the optical head 2 due to vibration occurring while the optical head 2 is moving, thereby preventing damage thereto. For this purpose, the above electrical locking with the track position signal TPS is a carried out.

STEP 002 (S002)

When the movement of the optical head 2 to the target track in this way is completed, the servo control is started, i.e., the seek operation mode is entered.

The MPU 5 outputs the gain changeover signal GCS having a high level to the gain changeover circuit 33, to turn ON the switch 330 in the gain changeover circuit 33, thereby connecting the resistor R2 to ground to reduce the servo gain to a low level which is approximately a half of that in the fine position control mode.

STEP 003 (S003)

Next, the MPU 5 outputs the servo-on signal SVS having a high level to the servo switch 36, to close the servo switch 36, and thus start the servo pull-in.

The track error signal TES generated at the TES generator circuit 30, which has been subjected to AGC in the AGC circuit 32 and to which a low gain has been imparted by the gain changeover circuit 33, is phase-compensated at the phase compensator circuit 35, and output to the inversion amplifier 39a through the servo switch 36, thereby forming a servo loop of the track error signal TES. At this time, since the lock-on signal LKS remains ON, the signal synthesized from the signal TCS from the phase compensator circuit 35 and the return signal RPS is supplied to the inversion amplifier 39a and the power amplifier 39 to drive the track coil 28f. Namely, the beam spot BS is controlled by the track error signal TES to follow up the track while the return force to the center shown in FIG. 9b is given with the return signal RPS. Accordingly, the servo pull-in is carried out with respect to a track on the optical disk 1 with an eccentricity at a point where the optical head 2 is moved the shortest distance in the radial direction across the track, and thus a stable servo pull-in is achieved.

Upon start of the servo pull-in, the beam spot BS follows the track, i.e., the servo pull-in is effected, so that the frequency of the track error signal TES becomes lower.

STEPS 004 AND 005 (S004 and S005)

After turning ON the servo-on signal SVS, the MPU 5 monitors the off-track signal TOS from the off-track detector circuit 34b, to determine whether or not the off-track state has existed for an elapse of a predetermined time $t_0$ (S004).

The off-track state is known from the peak of a sinusoidal wave track error signal TES, as described with reference to FIG. 5, and the off-track signal TOS is generated when the peak of the sinusoidal wave track error signal TES is detected.

When the off-track signal TOS having a high level is not generated for the predetermined time $t_0$, the MPU 5 determines that an on-track state has been nearly reached, and proceeds to monitor the track zero-cross signal TZC.

Since the track zero-cross signal TZC is generated when the track error signal TES reaches the zero-cross point, the zero-cross signal TZC and track error signal TES are set when the MPU 5 detects that the track zero-cross signal TZC is not inverted for a predetermined time $t_1$. Namely, the MPU 5 detects that the on-track state exists, and the servo pull-in is completed.

STEPS 006 and 007 (S006 and S007)

When the MPU 5 detects that the servo pull-in has been completed, the MPU 5 outputs the gain changeover signal GCS having a low level to open the switch 330 of the gain changeover circuit 33 (S006). Consequently, the resistor R2 is disconnected from the ground to bring the servo gain to a high level, and thus stabilize the servo system.

Next, the MPU 5 outputs the lock-on signal LKS having a low level and deenergizes the lock-on switch 38 to release and terminate the pull-in control in which the return signal RPS is used (S007). As a result, after completion of the servo pull-in, the track servo control is carried out by a high servo gain due to the track error signal TES. In this state, the subsequent read and/or write of the optical 1 disk can be stably carried out.

During the servo pull-in, the servo control can be conducted with a relatively low servo gain by which the circuit is not saturated, and after completion of the servo pull-in, the servo control can be conducted in a stable state, by a relatively high servo gain. The appropriate servo gains can be set during the servo pull-in and after completion of the servo pull-in, respectively.

During the seek mode when the servo is OFF, the servo gain may be high or low, without causing an adverse influence, but a low gain must be selected when the servo control is applied. When the servo control is carried out after completion of the servo pull-in, the servo gain is changed to a high level. Also a high gain should be selected during the read and/or write operation.

Since the return signal RPS is used in this embodiment, the servo pull-in can be carried out at an area at which the movement in the radial direction of the optical disk 1 is small.

In the above described embodiment, the gain changeover circuit 33 is provided between the AGC circuit 32 and phase compensator circuit 35, but this circuit 33 may be provided downstream of the TES generator circuit 20 or the phase compensator circuit 35. Namely, the gain changeover circuit 33 should be provided upstream of a circuit which is likely to be saturated.

Also, the construction of the track servo controller 3 is not limited to that of the aforementioned embodiment, but a variety of track servo controller constructions can be adopted; for example, the AGC circuit 32 may be provided downstream of the phase compensator circuit 35, if required, and the gain changeover circuit 33 itself is not limited to that used in the embodiment, but may be, for example, a circuit which changes the gain resistance of an amplifier in any circuit, for example, the AGC circuit.

The foregoing description has referred to a reflection-type optical disk unit, but the present invention can be also applied to a penetration type optical disk unit. Also, the light receiver 26 used in the embodiment is a four-division photodetector, but may be any well-known photodetector which can provide a track error signal, such as two-division photodetector. Further, the generation of a track error signal is not limited to the push-pull method.

A photodetector for reception of the RF signal may be provided independently of the four-division light receiver 26, and the track servo actuator may be a type which moves the object lens 20 as well as a type which moves the spot light by pivoting the mirror in the optical system 23, and further, a combination of the pivoting of the mirror and the movement of the object lens 20 may be adopted.

Although the preferred embodiments according to the present invention are described in the foregoing, the present invention can be embodied in a variety of forms within the scope and spirit of the present invention.

What is claimed is:

1. A track servo control system for an optical disk apparatus including a rotatable optical disk on which a plurality of grooves for recording data are spirally formed along a direction of rotation of the rotatable optical disk, an optical head which is movable in a radial direction across the optical disk and includes a light source for emitting light onto one of the grooves, an intermediate optical system including a beam splitter, an object lens for focusing the light from the light source onto the groove through the intermediate optical system and receiving light reflected from the groove, a track error sensor for receiving the reflected light through the intermediate optical system and outputting a track error signal in response to a deviation of the light incident on the groove from the center of the groove, and a track actuator for moving the object lens in the radial direction, said track servo control system comprising:

servo pull-in detecting means, operatively connected to the track error sensor, for detecting a completion of a servo pull-in operation in accordance with the track error signal; and servo control means, operatively connected to the track error sensor and the track actuator, for controlling the track actuator in response to the track error signal to position the object lens so that the light from the object lens is incident on a center of a desired groove on the optical disk, and having a low servo control gain and a high servo control gain, the low servo control gain being selected by said servo pull-in detecting means during the servo pull-in operation in which the operation of the track actuator is controlled to make the light from the light source incident on the center of the groove in response to the track error signal, and the high servo control gain being selected by said servo pull-in detecting means after completion of the servo pull-in operation.

2. A track servo control system according to claim 1, wherein said servo pull-in detecting means generates a gain change signal, and wherein said servo control means comprises:

a gain exchange circuit, coupled to the track error sensor and said servo pull-in detecting means, for receiving the track error signal, for selecting the low servo control gain or the high servo control gain in response to the gain change signal from said servo pull-in detecting means, for multiplying the selected servo control gain by the track error signal, and for producing an output signal; and a phase compensation circuit, connected to said gain exchange circuit, for receiving the output signal therefrom, including:
  a proportional circuit for generating a signal proportional to the received output signal;
  a differential circuit for carrying out a phase compensation of the received signal; and
  an adding circuit, coupled to said proportional circuit and said differential circuit, for adding the signals from said proportional circuit and said differential circuit, to output a resultant added signal as a servo control signal.

3. A track servo control system according to claim 2, wherein said servo control means further comprises a servo switching circuit, operatively connected to the track actuator and said phase compensation circuit, for switching the servo control signal from said phase compensation circuit so that the servo control signal to said track actuator is out off during a seek operation of the optical head, or is applied to said track actuator after completion of the seek operation.

4. A track servo control system according to claim 1, wherein the optical disk apparatus further includes a track position sensor for generating a track position signal and wherein said servo control means provides a servo control signal, further comprising:

return signal generation means for receiving the track position signal from the track position sensor and generating a return signal for restoring the track actuator to a center position thereof in response to the track position signal;

lock switching means, operatively connected to said return signal generation means, for passing the return signal to the track actuator to lock the track actuator during a servo pull-in operation and cutting off the return signal to the track actuator after the servo pull-in operation; and means for adding the servo control signal from said servo control means and the return signal from said lock switching means to provide a summation signal to drive the track actuator.

5. A track servo control system according to claim 1, wherein said servo pull-in detecting means comprises:

a zero cross detection circuit, coupled to the track error sensor, for detecting a time at which the track error signal crosses a zero voltage and outputting a track zero cross signal;

an off track detection circuit, coupled to the track error sensor, for detecting when the track error signal is in a predetermined range and outputting an off-track signal; and a supervisory controller, operatively connected to said zero cross detection circuit and said off track detection circuit, for detecting the completion of the servo pull-in accordance with the track zero cross signal and the off-track signal.

6. A track servo control system according to claim 5, wherein said supervisory controller determines that the servo pull-in has been completed when a first predetermined time has elapsed after an issue of the off track detection signal, and a second predetermined time is continued when the track zero cross signal is not changed and after the elapse of the first predetermined time.

7. A track servo control system according to claim 1, further comprising automatic gain control means, operatively connected between the track error sensor, said servo pull-in detecting means and said servo control means, for automatically controlling a gain of the track error signal to supply a gain adjusted track error signal to said servo pull-in detecting means and said servo control means.

8. A method for controlling a track servo according to claim 1, comprising the steps of:

locking-on said track actuator to lock-on said track actuator at a restore position thereof just after completion of a seek operation;

selecting the low servo control gain at said servo control means;

energizing said servo control means to pull-in a servo control loop of said track actuator;

detecting the completion of the servo pull-in;

selecting the high servo control gain at said servo control means, after the completion of the servo pull-in; and releasing said lock-on of said track actuator.

9. A servo control system for an optical disk apparatus for use with an optical disk having a plurality of grooves formed thereon, said optical disk apparatus including an object lens for focusing light onto one of the grooves and receiving light reflected from the groove, said optical disk apparatus including a track error sensor for receiving the reflected light from the object lens and outputting a track error signal in response to a deviation of the light incident on the groove from the center of the groove, said optical disk apparatus further including a track actuator for moving the object lens, said servo control system comprising:

servo pull-in detecting means, coupled to the track error sensor, for detecting a completion of a servo pull-in operation in accordance with the track error signal and for generating a gain selection signal; and servo control means, coupled to said servo pull-in detecting means, the track error sensor and the track actuator, for controlling the track actuator in response to the track error signal to position the object lens so that the light from the object lens is incident on the center of the groove, said servo control means having a first servo control gain and a second servo control gain which is greater than the first servo control gain, the first servo control gain being selected based on the gain selection signal during the servo pull-in operation in which the operation of the track actuator is controlled to make the light from the light source incident on the center of the groove in response to the track error signal, and the second servo control gain being selected based on the gain selection signal after completion of the servo pull-in operation.

10. An optical disk apparatus for use with a rotatable optical disk having a plurality of grooves for recording data formed thereon comprising:

an optical head movable in a radial direction across the optical disk, said optical head emitting light onto one of the grooves and receiving light reflected from the groove, said optical head including:

an object lens for focusing the emitted light onto the groove and receiving light reflected from the groove;

a track error sensor for receiving the reflected light from said object lens and outputting a track error signal in response to a deviation of the light incident on the groove from the center of the groove; and a track actuator for moving the object lens in the radial direction;

servo pull-in detecting means, coupled to said track error sensor, for detecting completion of a servo pull-in operation based on the track error signal and for generating a gain selection signal; and servo control means, coupled to said servo pull-in detecting means, said track error signal and said track actuator, for controlling said track actuator in response to the track error signal to position said object lens so that the light from said object lens is incident on the center of the groove, said servo control means having a first servo control gain and a second servo control gain which is higher than the first servo control gain, the first servo control gain being selected based on the gain selection signal during the servo pull-in operation in which the operation of said track actuator is controlled to make the light from the light source incident on the center of the groove in response to the track error signal, the second servo control gain being selected based on the gain selection signal after completion of the servo pull-in operation.

* * * * *

UNITED STATES PATENT AND TRADEMARK OFFICE
CERTIFICATE OF CORRECTION

PATENT NO. : 4,975,895
DATED : DECEMBER 4, 1990
INVENTOR(S) : SHIGENORI YANAGI

It is certified that error appears in the above-identified patent and that said Letters Patent is hereby corrected as shown below:

Col. 3, line 16, "to" should be --and--;
line 38, "FIG." should be --FIGS.--.

Col. 7, line 17, "position" should be --positioned--.

Col. 9, line 41, "TEC" should be --TZC--;
line 48, "compara-" should be --< -Vo, and outputs the sum of the signals from the compara- --.

Col. 13, line 53, "out" should be --cut--.

Signed and Sealed this

Twenty-eighth Day of April, 1992

Attest:

HARRY F. MANBECK, JR.

*Attesting Officer*  *Commissioner of Patents and Trademarks*